Dec. 30, 1924.
F. A. STEVENS
1,520,977
OPHTHALMIC MOUNTING
Filed June 22, 1921
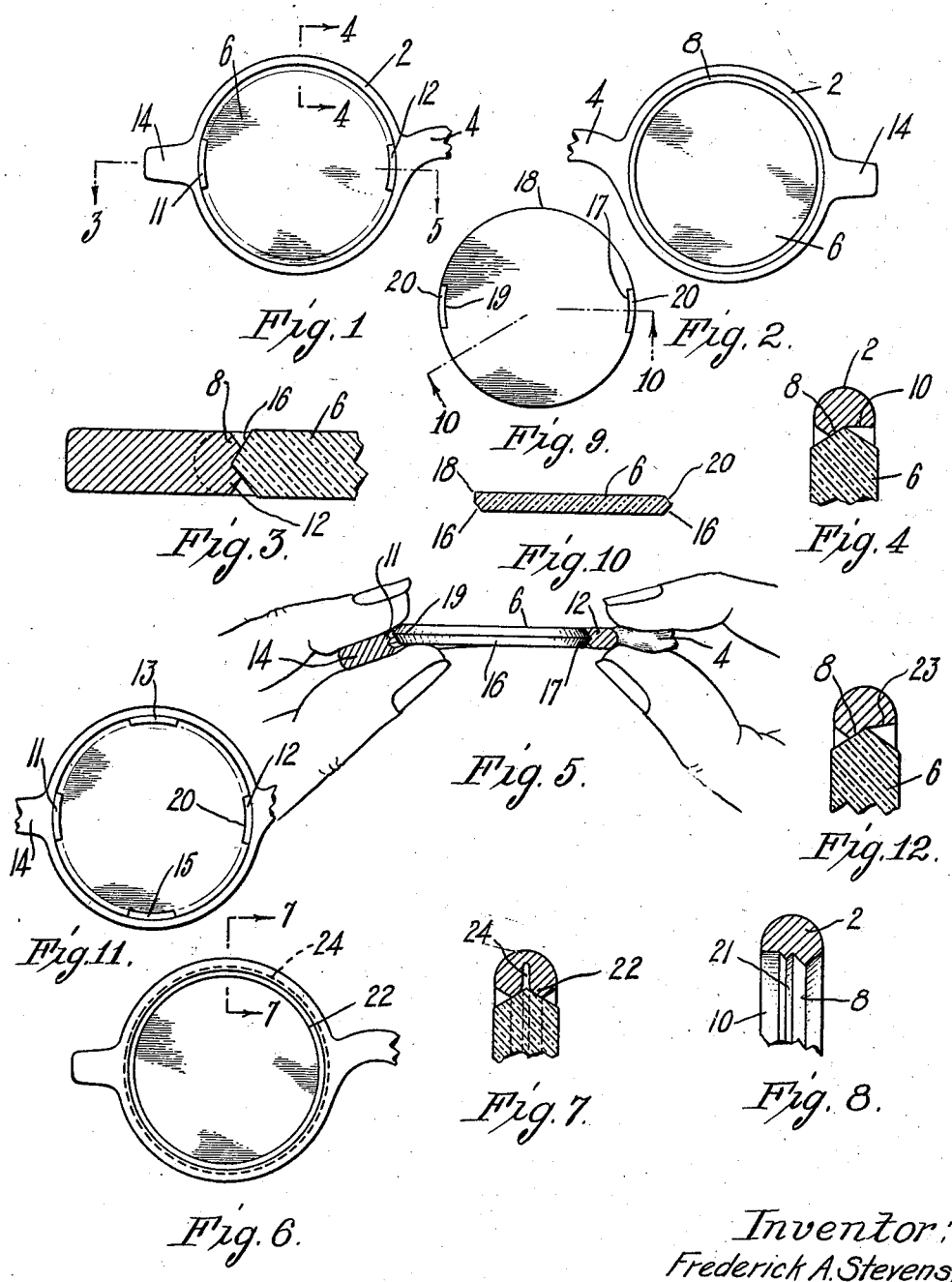
Inventor:
Frederick A. Stevens.
By David Rines
Attorney;

Patented Dec. 30, 1924.

1,520,977

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed June 22, 1921. Serial No. 479,480.

*To all whom it may concern:*

Be it known that I, FREDERICK ARTHUR STEVENS, a citizen of the United States, and a resident of Providence, in the county of Providence and State of Rhode Island, have invented a new and useful Improvement in Ophthalmic Mountings, of which the following is a specification.

The present invention relates to ophthalmic mountings comprising lens-holding rims and more particularly to mountings of the all-"shell" type, constituted of non-metallic material, like celluloid, zylonite and the like.

As the non-metallic material, though more or less resilient, is not sufficiently so to permit mounting lenses within the endless rims at ordinary temperatures, it is necessary to apply heat, which permits of stretching or expanding the rims to increase temporarily their calibre. This is a drawback, for besides the inconvenience attending the heat application, the mounting may become distorted in consequence.

Endless non-metallic rims have been heretofore proposed so constructed as to permit lenses to be inserted within them by temporarily springing back resilient segmental members that are allowed to return by their resiliency into their normal places after the lens has been forced into its seat. The temporary springing back of the segmental members serves to increase for the moment the calibre of the groove, permitting entry of the lens. Owing to the resilient nature of the segmental members, however, they cannot hold the lens tightly in place, so that additional metal clamping members have been needed to clamp the non-metallic rim against the lens, and thereby prevent accidental rotation of the lens within its seat.

The chief object of the present invention is to provide an ophthalmic mounting comprising endless rims constituted of non-metallic material within the rims of which lenses may be tightly, non-rotatably mounted without the necessity of previously expanding or stretching the non-metallic material.

A further object is to provide a novel lens particularly adapted for use with the mounting of the present invention.

With these and other objects in view, the invention consists of the improved ophthalmic mounting hereinafter described, illustrated in the accompanying drawings and defined in the appended claims.

In the drawings, Fig. 1 is a view in rear elevation of a portion of a spectacle mounting constructed according to a preferred embodiment of the present invention; Fig. 2 is a view in front elevation of the same; Fig. 3 is a section taken upon the line 3—5 of Fig. 1; Fig. 4 is a section taken upon the line 4—4 of Fig. 1; Fig. 5 is a section similar to Fig. 3, showing a lens in the act of being inserted in the mounting of Fig. 1; Fig. 6 is an elevation similar to Fig. 1 of a modification; Fig. 7 is a section taken upon the line 7—7 of Fig. 6; Fig. 8 is a section similar to Fig. 4 of another modification; Fig. 9 is a view of a preferred lens particularly adapted for use with the ophthalmic mounting illustrated in Fig. 1; Fig. 10 is a section taken upon the line 10—10 of Fig. 9, looking in the direction of the arrows; Fig. 11 is a view similar to Fig. 1 of another modification; and Fig. 12 is a view similar to Fig. 4 of still another modification.

Ophthalmic mountings of the above-described character, constituted of non-metallic material, like celluloid, zylonite and the like, comprise two endless rims 2 (one only is shown in the drawings) integrally connected together by a bridge 4, and each having integral temple end pieces 14. The bridge and the end pieces need not, however, be integral. They may be made of metal or other material and they may be attached to the rims in any well-known manner.

According to the present invention, the lenses may be mounted within the rims without stretching or expanding them, whether by the application of heat or otherwise. To this end, according to the preferred embodiment of the invention, the lens-receiving grooves are each provided on one side with a wall 8, against which the lens is adapted to rest, the other side of the groove being cut away, or open, as shown at 10. This makes it possible to insert within the groove, by way of the open side 10, a lens of diameter substantially equal to the calibre of the groove. One or more clips are provided at the open side of the groove to prevent the lens falling out of the groove. Two clips 11 and 12 are shown in Fig. 1, and two additional clips 13 and 15 are illustrated in the modification of Fig. 11. The clip 11 is shown near the temple end piece 14, and the clip 12 near the bridge 4, but it will be understood that the number, the location and the dimension of the clips may be varied as desired.

The clips are shown integral with the body of the mounting, but they may be separable and they may be constituted of metal or any other desired material. Separable clips may be preferred if the rims are made of metal, and the use of such is considered to be within the scope of the present invention. When separable clips are employed, they may be removed, and replaced after the lens has become seated in its groove. If integral clips such as are shown are employed, it is necessary to move one or more of them, as the clip 11, temporarily aside to permit inserting the lens. This may be effected by temporarily bending or springing back the portion of the rim 2 near the temple end piece 14, for example, a little out of its plane, as is illustrated in Fig. 5. The bending or springing is rendered possible by the resilient character of the material of which the mounting is constituted. To supply the necessary leverage for the bending or springing action, the end piece 14 and the bridge 4 may be grasped, one in each hand, as is illustrated in Fig. 5.

One side 17 of the lens is then placed in position between the other clip 12 and the portion of the wall 8 of the lens groove near the bridge 4, and the portion of the rim near the temple end piece 14 may be allowed to spring or snap back into its plane, into position over the opposite side 19 of the lens, from the position illustrated in Fig. 5 into that shown in Fig. 3. The lens is thus readily and conveniently mounted within its groove, and is retained within its groove by the wall 8 engaging one of its faces, and the clips engaging the other face.

As it is unnecessary to distort the rims by heat or otherwise, the mounting will permanently retain its original shape, so that when a properly shaped lens is once properly fitted into a groove of proper size and shape, it will remain properly fitted, neither too loose nor too tight. The dangers of accidental axial derangement of the lens within its groove, caused by the lens being too loose, and of the rim cracking, caused by the lens being too tight in its groove, are thus eliminated.

Lenses are ordinarily supplied to the trade in the form of uncut blanks which are cut to proper shape and size by the optician according to the needs of the purchaser. The edges of the lens are then beveled to conform to the shape of the lens-receiving grooves. According to the present invention, the lens need be beveled all along one edge only, as shown at 16, to conform to the shape of the wall 8. As the side 10 of the lens-receiving groove is open, or cut away, it is unnecessary to bevel the other edge 18 of the lens, except at one or more isolated spots 20, depending upon the number of clips, within which the clips are adapted to enter; and a better seating effect of the lens within the groove is, indeed, obtained by leaving the edge 18 of the lens unbeveled, except at 20. The clips engage the walls of the notches 20, moreover, further to insure the lens against rotation. This is a valuable feature in case the lens does not happen to fit exactly and properly within the lens groove. The clips are thus adapted to perform a double function:—first, to prevent the lens falling out of its groove; and secondly, to insure the lens against rotation.

It is not essential that the side 10 of the lens-receiving groove be completely cut away. It is sufficient that the calibre of the groove at the side 10 be larger than the smallest calibre of the wall 8, but not too small to admit entry of the lens. This will be understood from an inspection of Fig. 8, in which a wall 21 is shown at the side 10. The lens rim is adapted to be snapped into position over the lens in a manner similar to that illustrated in connection with the showing of Fig. 5, the lens being adapted to enter the groove by way of the wall 21. The calibre of the wall 10 may, on the other hand, be larger than is shown in Fig. 4, being beveled outward, as is disclosed at 23 in Fig. 12. This permits more ready insertion of the lens and helps also the bending or springing action of the rim illustrated in Fig. 5; for obviously the more that the rim is cut away at 10, the more easily the portion of the rim at 14 may be bent out of its plane.

In the modification of Figures 6 and 7, the groove is shown wider at the mouth 22 than at the throat 24. The portion of the rim near the mouth 22 of the groove constitutes a lens seat and is of calibre substantially equal to the diameter of the lens. By carrying the groove back into a throat 24, it becomes possible to spring apart the portions of the rim on opposite sides of the groove. When the opposite portions of the rim are so sprung apart, the lens may readily be inserted, after which the portions of the rim may be permitted to spring back into normal position to hold the inserted lens in place. The subject matter of Figs. 6 and 7 is specifically claimed in a copending divisional application, Serial No. 587,077, filed September 9, 1922.

According to the present invention, therefore, an ophthalmic mounting comprising endless rims, is adapted for use with either ordinary lenses, or lenses of the special type shown in Figs. 9 and 10, without the necessity of stretching or expanding the shell material by means of heat or in any other manner. It will be understood that the invention is not restricted to the exact embodiments thereof that are illustrated in the accompanying drawings and described herein, and that all modifications within the skill of the artisan are considered to be within the spirit and scope of the present invention, and are intended to be covered by the appended claims.

What is claimed as new is:

1. An ophthalmic mounting comprising an endless rim having a lens-receiving groove of calibre substantially equal to the dimension of the lens, one of the walls of the groove being of dimension such as to permit entry of the lens, one or more clips being provided for retaining the lens within the groove.

2. An ophthalmic mounting comprising an endless rim having a lens-receiving groove provided on one side with a wall against which the lens is adapted to rest, the other side of the groove having a wall of larger calibre than the calibre of the first named wall, to permit a lens of dimension substantially equal to the calibre of the groove to be mounted in the groove by way of the wall of larger calibre, and means for retaining the lens within the groove.

3. An ophthalmic mounting comprising an endless rim constituted of non-metallic material having a lens-receiving groove provided on one side with a wall against which the lens is adapted to rest, the other side of the groove having a wall of larger calibre than the calibre of the first-named wall and having one or more clips for retaining a lens within the groove, whereby a lens of dimension substantially equal to the calibre of the groove may be mounted in the groove by way of the wall of larger calibre by temporarily bending the portion of the rim near a clip out of its plane.

4. An ophthalmic mounting comprising an endless rim constituted of non-metallic material having a bridge and a temple end piece and a lens-receiving groove provided on one side with a wall against which the lens is adapted to rest, the other side of the groove having a wall of larger calibre than the calibre of the first-named wall to permit a lens of dimension substantially equal to the calibre of the groove to be mounted in the groove by way of the wall of larger calibre by grasping the bridge and the temple end piece, one in each hand, and temporarily bending the portion of the rim near the temple end piece out of its plane, clips being provided at the said other side of the groove for retaining the lens within the groove.

5. An ophthalmic mounting constituted of comparatively rigid, unreinforced non-metallic material that is adapted to be expanded by heat comprising a bridge and endless lens-holding rims integrally connected together, the rims being unslotted so as not to impair their rigidity, means whereby a lens of dimension substantially equal to the calibre of the rim may be mounted in position within an unheated rim, and means for retaining the lens within the rim.

6. An ophthalmic mounting constituted of comparatively rigid, unreinforced non-metallic material that is adapted to be expanded by heat comprising a bridge and endless rims integrally connected together, the rims being unslotted so as not to impair their rigidity, each rim being provided with a lens-receiving groove of calibre substantially equal to the dimension of the lens, means whereby the lens may be mounted in position within the unheated rim, and means for retaining the lens within the rim.

7. A lens, one face of which is beveled all along an edge, and the other face of which is beveled at one or more portions of the other edge.

8. An ophthalmic mounting comprising an endless rim constituted of resilient material and provided with a lens-receiving groove having walls on both sides of the groove, the walls of the groove being of different calibre to permit a lens of dimension substantially equal to the calibre of the groove to be snapped into position within the groove by way of the wall of larger calibre.

9. In combination, an endless rim provided with a lens-receiving groove and a clip, and a lens provided with a notch adapted to receive the clip, the walls of the notch being adapted to be engaged by the clip to prevent rotation of the lens.

10. An ophthalmic mounting comprising an endless rim having a lens-receiving groove provided on one side with a wall against which the lens is adapted to rest, the other side of the groove being open to permit a lens of dimension substantially equal to the calibre of the groove to be mounted in the groove by way of the open side of the groove.

In testimony thereof, I have hereunto subscribed my name this 15th day of June, 1921.

FREDERICK A. STEVENS.